June 4, 1963 A. H. PHILLIPS 3,092,833

CARRIER PHASE MODULATED DUAL PURPOSE COMMUNICATION SYSTEM

Filed May 1, 1961 4 Sheets-Sheet 1

INVENTOR.
ALAN H. PHILLIPS
BY
Henry Huff
ATTORNEY

INVENTOR.
ALAN H. PHILLIPS
BY
Harry Hauff
ATTORNEY

CARRIER PHASE MODULATED DUAL PURPOSE COMMUNICATION SYSTEM

Filed May 1, 1961

4 Sheets-Sheet 3

INVENTOR.
ALAN H. PHILLIPS
BY Henry Huff
ATTORNEY

INVENTOR.
ALAN H. PHILLIPS
BY
[signature]
ATTORNEY

United States Patent Office 3,092,833

Patented June 4, 1963

3,092,833

CARRIER PHASE MODULATED DUAL PURPOSE COMMUNICATION SYSTEM

Alan H. Phillips, Syosset, N.Y., assignor to Sperry Rand Corporation, Great Neck, N.Y., a corporation of Delaware Filed May 1, 1961, Ser. No. 106,850
12 Claims. (Cl. 343—105)

The invention relates to radio communication systems adapted for the simultaneous transmission of message and navigational data and, more particularly, to a dual purpose communication system in which the signal-to-noise ratio of the navigational data is enhanced by the use of carrier phase modulation.

A dual purpose communication system is one whose single radio transmission is utilized simultaneously for two independent purposes. Such a system is disclosed in U.S. Patent No. 2,969,538, issued on January 24, 1961, in the name of Winslow Palmer and assigned to the present assignee. The patented system contemplates the use of a conventional Teletype radio communication system whose transmission is modified to include navigational data without interfering with the pre-existing message data.

As is well known, a conventional Start-Stop radio Teletype system transmits a sequence of pulses whose time separation is representative of coded data. The coded data consists of a succession of characters, each character comprising a group of seven elements, the first of which is always a space (absence of a pulse) denoting the start of a group, the next five elements each being a mark (presence of a pulse) or a space depending upon the particular character being sent, and the last element being a mark of indeterminate length whose termination always designates the beginning of the start element of the next code group. As pointed out in the abovementioned patent, if any one character were repeated indefinitely and a Fourier analysis were made of the resultant character signal spectrum, a pronounced frequency component would be observed at the fourth harmonic of the character repetition frequency. The phase of the fourth harmonic would depend upon the particular character being repeated.

Inasmuch as the usual Teletype message consists of an arbitrary succession of characters, the fourth harmonic component would vary in phase from character to character. Hence, there would be no strong reinforcement of the fourth harmonic component by the successive character transmissions so that the amplitude of the detected component would not be appreciable. The aforementioned patent discloses a technique for reinforcing the fourth harmonic by varying the length of the stop element of each character in a predetermined manner. By this technique, the fourth harmonic component is phase stabilized from character to character to add navigational data to the pre-existing message data without affecting the message data.

Radio navigation systems are well known in the art which utilize phase information present in the transmitted signals. The location of an unknown receiving point may be determined by the intersection of contours of constant phase angle generated by phase coherent signals transmitted from three or more spaced transmitters. Each transmitter may be distinguished on the basis that it emits a carrier of characteristic frequency. Each transmitted carrier, in turn, may be modulated by waves having a common frequency, which waves are phase coherent at their respective transmitter locations.

Inasmuch as a radio wave is propagated with finite velocity, the phase of the demodulated signal received from the first station will lag through an angle dependent upon the distance between the first station and the receiving point. Similarly, the phase of the demodulated signal received from the second station will lag by another angle dependent upon the distance between the second station and the receiving point. Contours of constant phase difference result, whose loci define a family of hyperbolae with the first and second stations as foci. Measurement of the phase angle between two demodulated signals at the receiving point places the receiver on a particular contour of constant phase. When two such contours are determined, for example, between signals from the first and second stations and between signals from the first and third stations, the resulting intersecting phase contours define the location of the receiver.

Apparatus for the generation of transmitted signals in prior art navigation systems such as just described is designed to accomplish only a navigational purpose. It would be convenient, however, if the phase coherent waves utilized for navigation were components of some other signals having the requisite phase stability, as used for communication for example. The aforementioned Patent 2,969,538, by phase stabilizing the fourth harmonic of the character repetition frequency of a conventional Start-Stop radio Teletype system, produces a resultant transmitted signal from which a receiver may extract message and navigational data without mutual interference, thereby permitting the use of common transmitting apparatus, receiving apparatus and radio spectrum for two independent purposes.

It is the general object of the present invention to provide apparatus for phase stabilizing a prominent frequency component of a coded transmitted signal whereby the signal-to-noise ratio of said component is substantially enhanced.

Another object is to phase stabilize a predetermined frequency component of coded signals by phase modulating the carrier thereof.

An additional object is to synchronize a predetermined modulation frequency component of coded signals transmitted from a plurality of stations, said component being phase stabilized by phase modulating the carrier of the coded signals.

Another object is to provide a receiver adapted to respond to each of contemporaneous message and navigation signal components of received coded signals wherein the navigation component is phase stabilized by phase modulating the carrier of the coded signals.

A further object is to provide a carrier phase modulated dual purpose communication system of extended range.

These and other objects of the present invention, as will appear from a reading of the following specification, are accomplished in an illustrative embodiment by the provision of apparatus to modify the transmissions of a conventional Start-Stop Teletype communication system. The transmissions are modified by repetitively phase shifting the carrier thereof from one to the other of two predetermined phase values at a preselected rate. The same carrier phase values recur at the frequency of a prominent harmonic of the Teletype character repetition rate which harmonic is to be phase stabilized for navigational purposes.

Means are provided for phase synchronizing the stabilized components of the Teletype signals transmitted by a plurality of Teletype stations. When the stabilized components are phase synchronized at two stations, the measurement of the phase difference between the two components as received at an unknown location establishes that the observer is somewhere along a particular phase contour. Two such measurements made along intersecting phase contours then fix the exact position of the observer. According to the present invention, the signal-to-noise ratio of the detected phase stabilized component is enhanced by the use of coherent phase detection techniques at the remote receiver. The increased signal-to-noise ratio makes possible the extraction of navigational data from the Teletype transmission at extended ranges from the Teletype transmission stations.

For a more complete understanding of the present invention, reference should be had to the following specification and to the appended figures of which:

Figure 1:
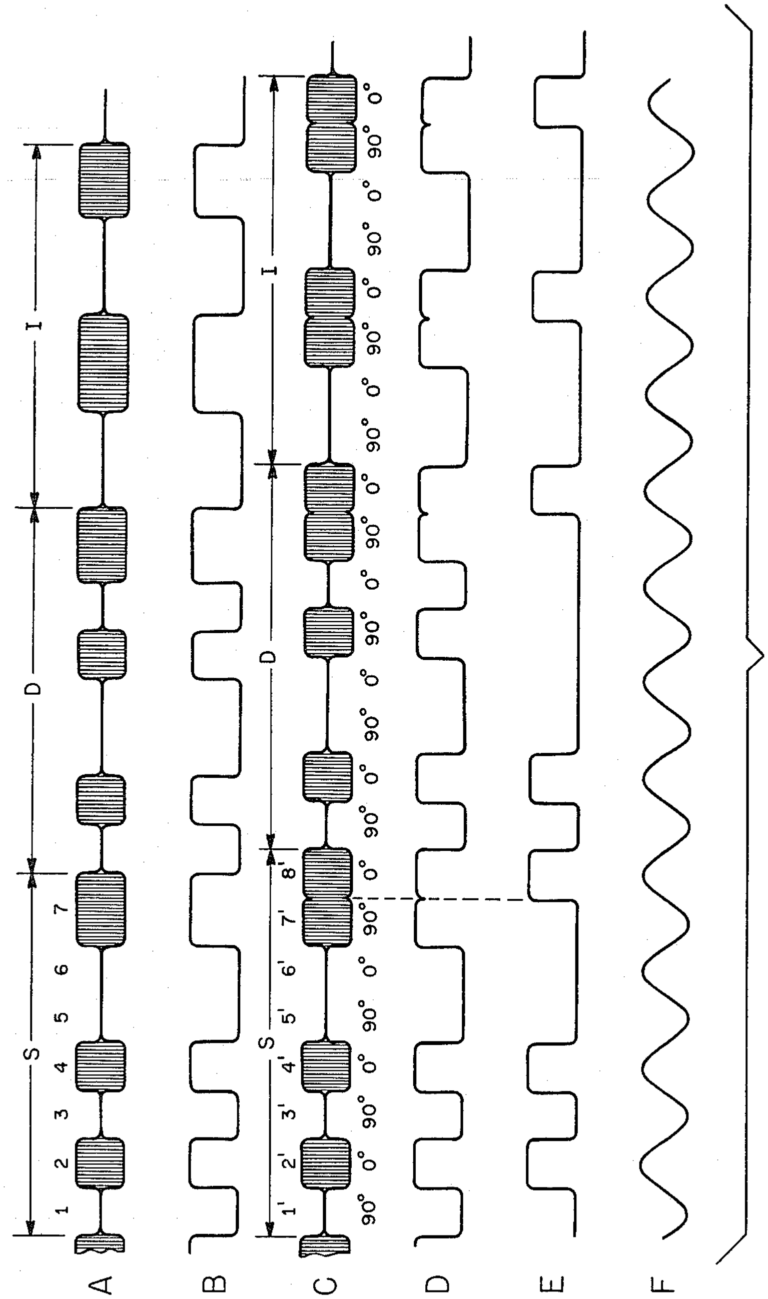
FIG. 1 is a series of waveforms including time diagrams of standard and modified Start-Stop Teletype signals which are useful in explaining the underlying principles of the present invention.

The process of stabilizing for navigation purposes a signal component of a conventional Start-Stop Teletype transmission may be exemplified by reference to the time diagram A of FIG. 1. In the conventional Start-Stop code, as shown in FIG. 1, each character consists of a code of 7 elements, the first of which is always a space (absence of a pulse) denoting the start of the element group comprising the character. The next five elements are individually either a mark (the presence of a pulse) or a space, depending upon the character being transmitted. The last element is always a mark of indeterminate length whose termination signifies the beginning of the start element of the next coded character.

Diagram A depicts an illustrative succession of three Teletype characters as might be transmitted. The first character, corresponding to the letter S of a conventional code, consists of the usual space 1, followed by mark 2, space 3, mark 4, and spaces 5 and 6. The character is terminated by the stop element or mark 7. Conventionally stop element 7 is of a duration approximately 1½ times as long as each of the equal length marks or spaces 1 to 6. The conventional coded signal of diagram A is detected at a receiver in the usual manner to produce the demodulated signal represented by diagram B.

In accordance with the present invention, the standard transmission of waveform A is modified in two respects. The stop element 7 is extended in duration to be equal to twice the length of the other character elements 1–6. Additionally, the phase of the carrier of each of the code elements 1–7 is alternated between two values which are 90° apart from each other. The alternating phase of the carrier are represented in diagram C by the legends 0° and 90° which designate the character elements. More particularly, the carrier phase of the first element 2' of the modified transmission which may be a pulse is designated 0°. The carrier phases of the elements 4', 6' and 8' are similarly designated. The carrier phase of the element 3' which may also be a pulse is designated 90°. The carrier phase of the elements 5' and 7' are similarly designated. It will be noted that elements 7' and 8' together comprise the extended stop element of the modified character. Thus, a 90° carrier phase shift is put in at the transition from one element to the next element, and a 90° phase shift is inserted midway through the stop element.

A conventional Teletype receiver employs an ordinary diode detector whose output would be substantially unaffected by the carrier phase modulation depicted in diagram C. If a mark is preceded and followed by a space, the detector output will be identically the same as though there were no phase modulation. If two marks occur in adjacent character elements (as is always the case with the extended stop element), the transient effect of the 90° phase shift causes a slight dip in the detector output as shown in diagram D. However, the dip is not wide or deep enough to interfere with the normal operation of the Teletype equipment which is responsive to the detector output.

In accordance with the present invention, a phase sensitive receiver is provided having the property that when the carriers of the incoming Teletype pulses are in phase with a local reference signal, a D.C. signal is produced proportional to the amplitude of the pulses. When the carriers of the incoming teletype pulses are in phase quadrature with said local reference signal, no D.C. signal is produced. The output of the receiver phase sensitive detector is represented by diagram E.

It can be seen by comparing diagrams C and E that any element pulses which occur during the times of 90° (quadrature) phase shift produce no output from the receiver phase sensitive detector. As a result of the effective removal of such pulses, the residual output of diagram E contains a strong component at the fourth harmonic of the character frequency. For example, where the character frequency is 6 cycles per second, the fourth harmonic is 24 cycles per second. The 24 c.p.s. harmonic signal is represented in diagram F.

It will be observed that the phase sensitive receiver output represented by diagram E corresponds only to those pulses (if present), having a 0° phase shifted carrier. No output pulses are produced in response to 90° phase shifted carrier pulses. Thus, although the three different coded characters S, D, and I of diagram A are transmitted, the pulses at the output of the phase sensitive detector are always concurrent with a positive half cycle of the 24 cycle harmonic component of diagram F to reinforce said component. All pulses, such as element 7' of diagram C, which might tend to cancel the harmonic component and reduce the signal-to-noise ratio thereof, are blocked by the action of the phase sensitive detector.

Figure 2:
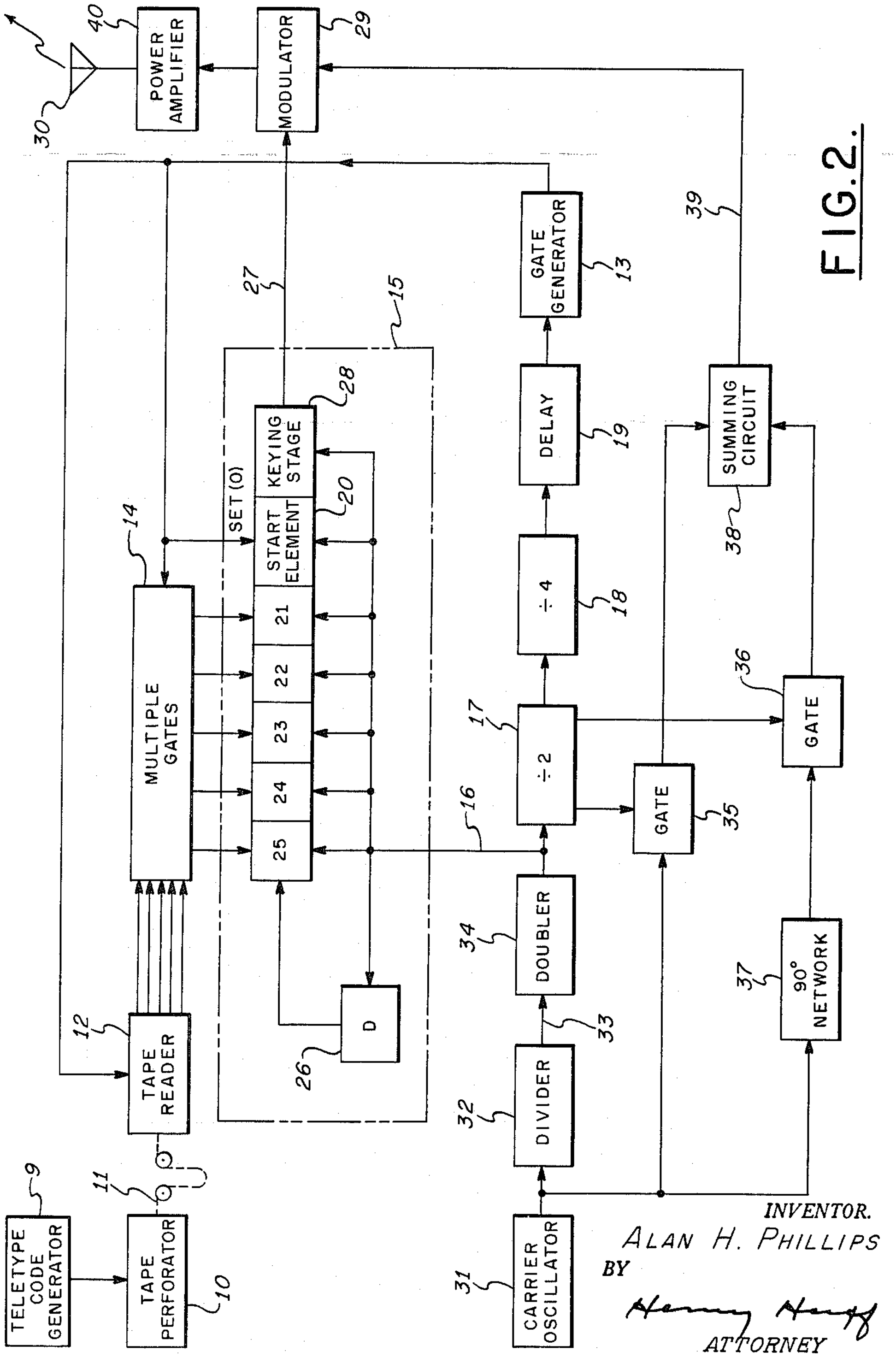
FIG. 2 is a simplified block diagram of an illustrative master transmitting apparatus for producing the modified Teletype signals represcented in FIG. 1.

FIG. 2 is a block diagram of an illustrative transmitter for generating the modified Teletype transmission of diagram C of FIG. 1. The message to be transmitted is generated in a conventional Teletype generator 9 whose output is applied to a standard tape perforator 10. Perforator 10 transcribes the message to be transmitted in the form of a punched Teletype tape 11. The message on tape 11 is put into a tape reader 12 which, in response to the trailing edges of signals derived from gate generator 13, transmits one character of the coded message at a time to the inputs of multiple gates 14.

Five connections are shown between tape reader 12 and the five gates comprising multiple gates 14. The connections couple the outputs of tape reader 12 (representing the five coded elements of a Teletype character) to respective stages comprising shifting register 15. The five gates of multiple gates 14 are simultaneously rendered conductive in response to the leading edge of the pulse produced by gate generator 13. Upon the occurrence of said leading edge, the component stages of shifting register 15 are "loaded" in parallel and placed into states of conduction corresponding to the presence of a mark or a space signal appearing on the respective outputs of tape reader 12. Multiple gates 14 then close, i.e., are rendered nonconductive.

Shifting pulses are applied via line 16 simultaneously to the individual stages comprising shifting register 15. In the illustrative embodiment, the shifting pulses recur at a rate which is eight times the character rate at which gates 14 are successively actuated. The relationship between the shifting pulses and character rates is deterbined by pulse repetition rate divider stages 17 and 18 which are connected in cascade to receive the shifting pulses appearing on line 16. Pulses at the output of divider 18 are applied via fixed delay element 19 to gate generator 13. The purpose of delay 19 is to cause the pulses produced by generator 13 to occur during the time between the pulses appearing on line 16. Thus, register 15 is loaded with a new character just after the occurrence of each 8th pulse and is triggered for the shifting out of the new character upon the occurrence of the next following pulse. The leading edge of the pulse produced by generator 13 also sets stage 20 of register 15 in a predetermined condition representing a space in terms of the Teletype character. The trailing edge of said pulse advances tape reader 12 for the application of the next successive character to the inputs of multiple gates 14.

Upon the occurrence of the first of the next following group of eight pulses on line 16, the new character is shifted out of register 15 with the condition of stage 25 being transferred to stage 24 at the same time the condition of stage 24 is transferred to stage 23 and so on. The shifting pulses are also applied via delay 26 to the reset input terminal of stage 25 wherein stage 25 is placed into a condition corresponding to a mark. Thus, upon the application of shifting pulses to register 15, the character elements appear on line 27 in serial sequence. The first element is always a mark (the pre-existing state of keying stage 28); the second is always a space (corresponding to the set condition of stage 20); the next five are determined by the digital number originally stored in elements 21–25, and the last is always a mark (produced by the delayed shifting pulse applied to the reset terminal of stage 25 by delay 26). Immediately upon the termination of the last (mark) pulse of the first series of eight pulses on line 27, a new series of eight pulses appears, the first of which is again a mark and the second of which is the usual space denoting the start of the elements of of the second character. Thus, a succession of five element characters appears in time sequence on line 27, the successive characters being separated by two marks and one space. Said electrical pulses are applied to a first input of amplitude modulator 29.

The carrier signal of the Teletype coded transmission to be radiated by antenna 30 is generated by carrier oscillator 31. In a representative case, the frequency of oscillator 31 may be 15 kilocycles per second. The carrier signal frequency is reduced by integral divider 32 and then increased by frequency doubler 34 to produce the shift pulses of line 16. In a typical case, divider 32 divides the carrier frequency by the integer 625 to produce pulses on line 33 having a repetition rate of 24 c.p.s. The repetition rate of the pulses on line 33 are increased in frequency doubler 34 to produce the shifting pulses on line 16 having a repetition rate of 48 c.p.s. As previously explained, the shifting rate pulses of line 16 are divided in frequency by dividers 17 and 18 to produce the character repetition rate pulses at the output of generator 13 having a frequency of six cycles per second.

Divider 17 may consist of a conventional bistable multivibrator which is placed into opposite states of conduction in response to the successive shifting pulses of line 16. The opposite outputs of the multivibrator are applied respectively to gates 35 and 36 whereby gate 35 is rendered conductive when gate 36 is blocked and vice versa. The carrier signal generated by oscillator 31 is directly applied to gate 35 and, via 90° phase shifting network 37, to gate 36. Network 37 introduces a 90° phase shift in the carrier signal. The output signals passed by gates 35 and 36 when conductive are additively combined in conventional summing circuit 38.

In operation, gates 35 and 36 apply in time alternation an unshifted carrier signal and a 90° phase shifted carrier signal to circuit 38 to produce on line 39 a sequence of carrier signals alternate ones of which are not phase shifted with the intervening alternate ones being phase shifted by 90°. The repetition rate of the signals on line 39 is identical to the repetition rate of the pulses appearing on line 27.

The carrier phase shifted signals of line 39 are applied to modulator 29 wherein they are amplitude modulated in accordance with the pulses apearing on line 27. That is, if a pulse appears on line 27, a pulse is produced at the output of modulator 29 having a carrier phase identical to that of the signal then appearing on line 39. No pulse is produced at the output of modulator 29 in the absence of a pulse on line 27. The carrier phase shifted pulses (such as typified by diagram C of FIG. 1) at the output of modulator 29 are applied via power amplifier 40 to antenna 30.

It is to be noted that the phase modulated pulses radiated by antenna 30 convey two independent sets of data. The presence or absence of pulses irrespective of the carrier phase thereof represents conventional Teletype message data. The carrier phases of the individual pulses convey data useful for navigational purposes, namely, a phase stabilized modulation component of 24 c.p.s. to be used in determining the position of a phase measuring receiver. The slave transmitting station represented by the block diagram of FIG. 3 produces the second modified Teletype signal having a 24 cycle modulation component coherently related to that radiated by the master station. Receiver position is determined by phase comparing the coherent modulation components received from the two stations. The slave station, like the master station, also transmits Teletype message data which may be entirely unrelated to the message data transmitted by the master station.

Figure 3:
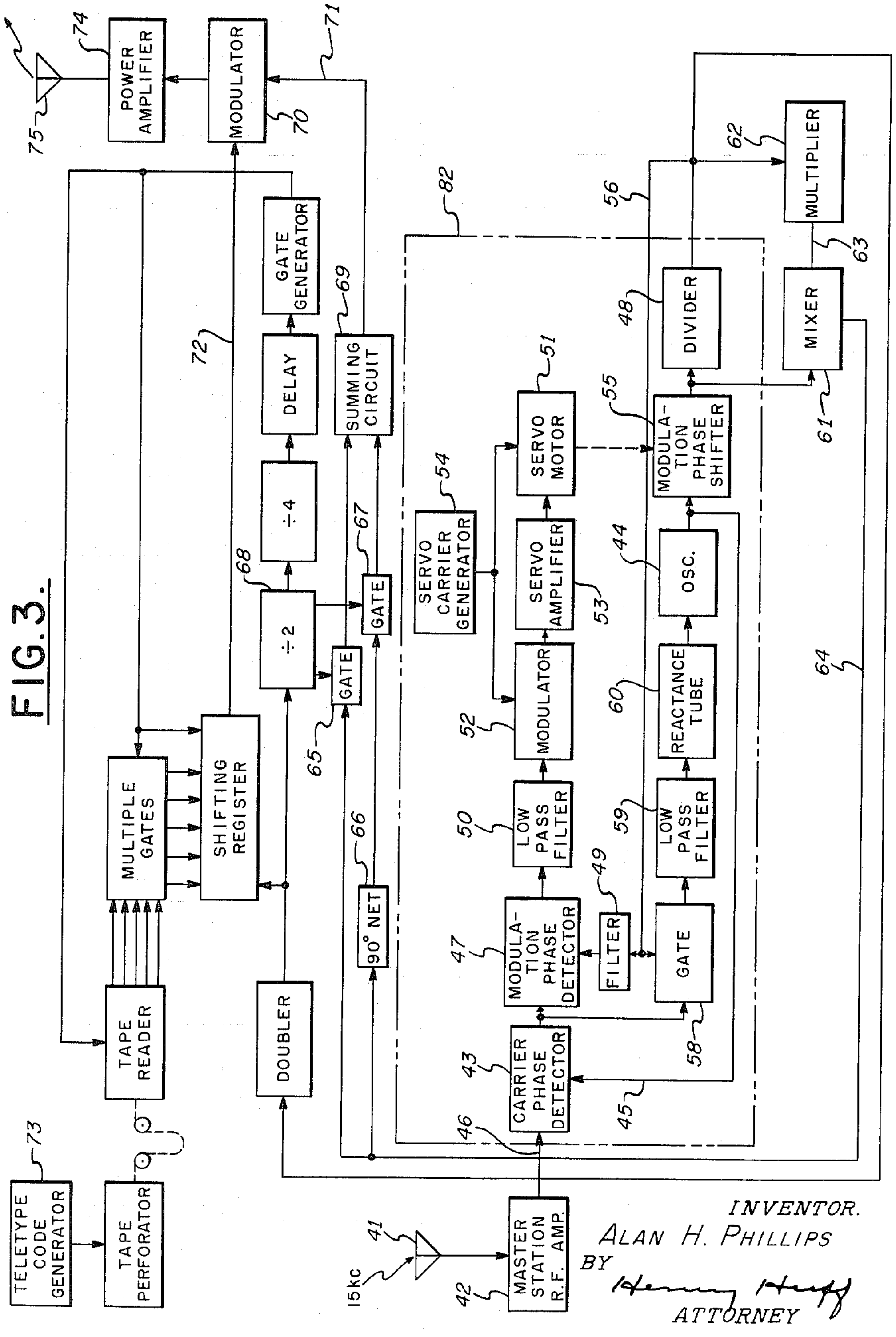
FIG. 3 is a simplified block diagram of a slave Teletype transmitter modified in accordance with the present invention.

Referring to FIG. 3, the carrier phase shifted pulses transmitted by the master station are received by antenna 41 and amplified in R.F. amplifier 42 which is tuned to receive the 15 kc. carrier signal of the master station. The amplified signals are applied to a first input of carrier phase detector 43, a second input of which is derived from oscillator 44. As will be seen more fully later, the phase of oscillator 44 is made coherent with the phase of either the 0° or the 90° phase shifted received carrier pulses. As is well known, it is the property of a conventional phase detector to produce an output only when its two input signals are in phase or in phase opposition. No output is produced when the two input signals are in phase quadrature. Consequently, pulses are produced at the output of phase detector 43 only when the locally generated reference of line 45 is in phase with the carrier of the amplified pulses appearing on line 46. The pulses of diagram E of FIG. 1 are typical of those which may be produced at the output of detector 43. Said pulses contain the strong modulation harmonic represented by diagram F.

The detected pulses are applied to a first input of modulation phase detector 47 which receives a reference signal at a frequency of 24 c.p.s. from the output of divider 48. The pulses which are produced at the output of divider 48 are converted into sine waves of the same frequency by filter 49 for application to detector 47. A signal is produced at the output of detector 47 having a D.C. component which is related solely to phase difference between the 24 cycle modulation component at the output of detector 43 and the 24 cycle reference signal applied via filter 49. The D.C. component is extracted by low-pass filter 50 and applied to servomotor 51 in a conventional manner via modulator 52 and servo amplifier 53. Modulator 52 inverts the D.C. signal at the output of filter 50 to produce an alternating signal having the frequency of the servo carrier produced by generator 54 and having an amplitude determined by the amplitude of the D.C. signal. The alternating signal is applied to servomotor 51 which also receives the same servo carrier produced by generator 54. Motor 51 is caused to rotate in a sense determined by the phase of the signal at the output of amplifier 53 relative to the phase of the servo carrier of generator 54.

The shaft of motor 51 positions electromechanical phase shifter 55 through which passes the local oscillator signal produced by oscillator 44. The phase shifted oscillator signal is operated on by integral divider 48 to produce a series of 24 cycle pulses on line 56 having a phase determined by the setting of phase shifter 55. The action of the modulation servo loop comprising devices 47, 50, 52, 53, 54, 51, 44, 55, 48, 56 and 49 is to drive the 24 cycle signal at the output of filter 49 into phase alignment with the 24 cycle modulation component at the output of detector 43.

As previously mentioned, the phase of the local signal generated by oscillator 44 is made coherent with the carrier phase of the signal on line 46. This action will now be described. The 24 cycle per second pulses appearing on line 56 activate gate 58 to sample the output produced by detector 43 during the occurrence of the sampling pulses. The D.C. component of the sampled pulses at the output of gate 58 is extracted from low-pass filter 59 and applied via reactance tube 60 to control the phase of oscillator 44. It is to be noted that the only time that no D.C. output is produced by gate 58 is when the sampling pulses occur at times when there is no output from phase detector 43. This, in turn, can occur only if the locally generated reference signal produced by oscillator 44 is precisely in phase quadrature with the carriers of alternate ones of the received Teletype pulses to which the sampling pulses are synchronized. This condition results in the production at the output of detector 43 of the pulses represented in diagram E of FIG. 1. So long as the phase quadrature condition is not fulfilled, a D.C. error signal is generated to bring the phase of oscillator 44 into a quadrature relationship with the carriers of alternate elements of the received Teletype signals.

The 15 kc. locally generated signal is applied to a first input of mixer 61. The 24 c.p.s. pulses at the output of divider 48 are applied to a second input of mixer 61 via frequency multiplier 62. Multiplier 62 increases the frequency of the 24 c.p.s. pulses by a factor of 42 to produce pulses having a repetition rate of 1,008 c.p.s. on line 63.

The resulting upper sideband at 16,008 c.p.s. is applied via line 64 directly to a first input of gate 65 and via 90° phase shift network 66 to a first input of gate 67. In a manner similar to that previously described in connection with the apparatus of FIG. 2, gates 65 and 67 are oppositely actuated at a 48 c.p.s. rate by the opposing outputs of divider 68 (corresponding to divider 17 of FIG. 2). The gated outputs from gates 65 and 67 are additively combined in circuit 69 and then applied to a first input of modulator 70. The phase modulated carrier signals appearing on line 71 are amplitude modulated in modulator 70 in accordance with the Teletype pulses appearing on line 72. Said Teletype pulses are produced in a fashion equivalent to the production of the Teletype pulses on line 27 of FIG. 2. It should be observed, however, that the message represented by the Teletype pulses of line 72 of FIG. 3 may be wholly independent of the message represented by the pulses of line 27 of FIG. 2. The Teletype message represented by the pulses of line 72 of FIG. 3 is determined in accordance with the message produced by code generator 73. The phase modulated carrier pulses at the output of modulator 70 are applied via power amplifier 74 to slave station antenna 75.

To summarize the operation of the apparatus so far described, the master station equipment of FIG. 2 transmits a Teletype coded message on a first carrier frequency of, say, 15,000 c.p.s. whereas the slave transmitter of FIG. 3 radiates a Teletype coded signal on a distinctive carrier frequency of 16,008 c.p.s. Each station transmits its own independent message. In both cases, however, the carrier frequency of the Teletype coded pulses is phase shifted in the same manner typified by diagram C of FIG. 1.

Figure 4:
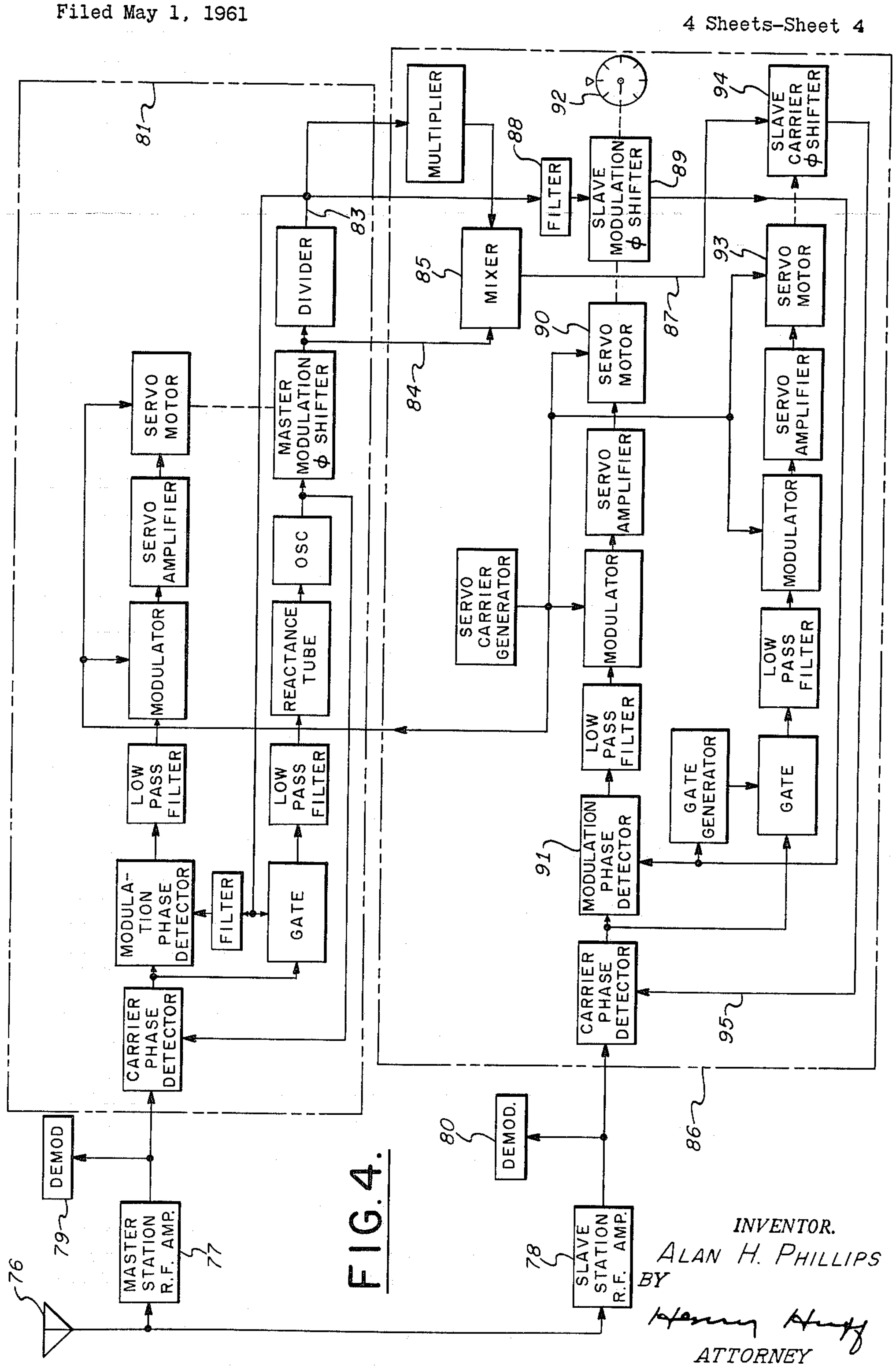
FIG. 4 is a simplified block diagram of a receiver adapted to produce individual message and navigational information outputs according to the present invention.

The Teletype signals transmitted by the master and slave stations are processed by a remote receiver represented by the block diagram of FIG. 4 to produce three distinctive outputs. One output is the conventionally detected Teletype message from the master station. Another output is a conventionally detected Teletype message from the slave station. The third output is an indication of the relative phase between the stabilized 24 cycle modulation components contained within each received Teletype signal. Said third output determines the constant phase contour on which the remote receiver is located with respect to the locations of the master and slave transmitting stations. As is well understood, it is necessary that a second phase measurement be made to establish the position of the remote receiver on a second phase contour which intersects the first phase contour to establish the point at which the receiver is situated. Such a second phase measurement requires the use of at least one additional slave transmitting station (not shown). The second slave transmitting apparatus is essentially identical to that represented by the block diagram of FIG. 3 and for that reason is not shown. Of course, the second slave station will also transmit a Teletype message independent of the message transmitted by the master station and the first slave station. In terms of the remote receiver, whose position is to be determined, the apparatus for making the required phase measurement between the master station and the second slave station signals is substantially identical to that require for making the measurement between the master station and the first slave station signals. Accordingly, only the apparatus for making the phase measurement between the master station and the first slave station signals will be described.

Referring to FIG. 4, the Teletype signals radiated by the master and slave stations are received by antenna 76 and applied to R.F. amplifiers 77 and 78. Amplifier 77 is tuned to pass only the master station carrier signal at 15,000 c.p.s. The amplifier 78 passes only the slave carrier signal at 16,008 c.p.s. Conventional Teletype signal demodulator 79 is connected to the output of amplifier 77 and reproduces the master station Teletype message in the usual manner. Similarly, conventional Teletype signal demodulator 80 is connected to the output of amplifier 78 and reproduces the Teletype message transmitted by the slave station. The received master carrier signal is applied to phase matching servo 81 which is similar in structure and operation to servo 82 described in connection with FIG. 3. Thus, there is produced on line 83 a 24 cycle per second signal which is phase locked with the 24 c.p.s. modulation component of the received master Teletype signal. A 15,000 cycle local reference signal is produced on line 84 and phase locked with the carrier of said master Teletype signal.

The two signals on lines 83 and 84 are combined as described in connection with FIG. 3 to produce at the output of mixer 85 of FIG. 4 a 16,008 c.p.s. signal. The purpose of the slave phase synchronizing servo 86 is to phase lock a phase shifted version of the 16,008 c.p.s. signal on line 87 with the carrier of the received slave transmission and to align a phase shifted version of the 24 cycle per second signal of line 83 with the 24 c.p.s. modulation component of the received slave signal.

The 24 c.p.s. pulses on line 83 are converted to a sine wave of the same recurrence frequency by filter 88 and applied to phase shifter 89 which is driven by the output of motor 90. Motor 90 is similar in function and operation to motor 51 of FIG. 3. Phase shifter 89 is caused to rotate by motor 90 so as to bring the 24 c.p.s. signal at the output of filter 88 in phase alignment at modulation detector 91 with the 24 c.p.s. modulation component of the received slave signal. When thus adjusted, the displacement of the shaft of electromechanical phase shifter 89 is proportional to the phase difference between the 24 c.p.s. modulation components of the received master and slave signals. This phase difference is indicated by calibrated wheel 92 and establishes the location of the receiver of FIG. 4 on a contour of constant phase with respect to the locations of the master and slave transmitting stations.

In place of a reactance tube and oscillator such as tube 60 and oscillator 44 utilized in the slave synchronizer of FIG. 3 and those of the master phase alignment servo 81 of FIG. 4, there is provided in FIG. 4 motor 93 and electromechanical phase shifter 94. The functions of motor 93 and phase shifter 94 correspond to the functions of the reactance tube and oscillator. Motor 93 and phase shifter 94 coact to phase align the 16,008 c.p.s. signal of line 95 with the 16,008 c.p.s. carrier of the received slave signal at the output of R.F. amplifier 78.

From the preceding specification it can be seen that the objects of the present invention have been achieved by the provision of apparatus for phase modulating in a predetermined manner the carriers of independent Teletype signals radiated from a plurality of Teletype transmitting stations. The phase modulation in no way interferes with the normal communication of the independent Teletype messages. The carrier phase modulation instead intensifies a modulation frequency component of the Teletype messages to facilitate the stabilization of said component at the transmitting stations and to enhance phase measurements made on the stabilized components for determining the position of a distant receiver. Said distant receiver is also adapted for the recovery of the independent Teletype messages.

Although the described embodiments have been presented in terms of a conventional "On-Off" keyed Teletype system, the present invention is readily adapted to a Teletype system of the frequency shift keyed type. In the latter system, instead of turning the transmitter "on" to produce a "mark" and turning it "off" to produce a "space," the marks and spaces are each represented by a respective carrier frequency pulse. That is, the transmitter is pulsed on a first carrier frequency to represent a "mark" and then pulsed on a second carrier frequency to represent a "space." A frequency shift keyed transmitter can be considered to be two on-off keyed transmitters each operating at a different carrier frequency. One of the two effective transmitters will produce output pulses from the receiver phase sensitive detector identical to those of waveform E of FIG. 1. The other of the two effective transmitters will produce a keyed audio signal at the output of said detector having a frequency equal to the difference between the first and second carrier frequencies. The keyed audio signal, however, will cause no problem so long as it is made to have no component at 24 c.p.s. in the illustrative case.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for phase stabilizing a predetermined frequency component of pulsed signals, said apparatus comprising a first source of carrier signals, a second source of pulsed signals containing said predetermined frequency component, phase shifting means connected to said first source for repetitively phase shifting said carrier signals from one to the other of two phase values whereby the same carrier phase values recur at the frequency of said predetermined frequency component, and a modulator coupled to said second source and to said phase shifting means, said pulsed signals amplitude modulating the repetitively phase shifted carrier signals.

2. Apparatus for phase stabilizing a predetermined frequency component of pulsed Teletype signals, the frequency of said component being related to the Teletype character repetition rate, said apparatus comprising a first source of carrier signals, a second source of pulsed Teletype signals containing said component, phase shifting means connected to said first source for repetitively phase shifting said carrier signals from one to the other of two phase values whereby the same carrier phase values recur at the frequency of said predetermined frequency component, and a modulator coupled to said second source and to said phase shifting means, said pulsed signals amplitude modulating the repetitively phase shifted carrier signals.

3. Apparatus for phase stabilizing a predetermined frequency component of pulsed Teletype signals, said component being a harmonic of the Teletype character repetition rate, said apparatus comprising a first source of carrier signals, a second source of pulsed Teletype signals containing said component, phase shifting means connected to said first source for repetitively phase shifting said carrier signals from one to the other of two quadrature phase values whereby the same carrier phase values recur at the frequency of said predetermined frequency component, and a modulator coupled to said second source and to said phase shifting means, said pulsed signals amplitude modulating the repetitively phase shifted carrier signals.

4. Apparatus for generating first pulsed signals having a predetermined frequency component which is synchronized to an equal frequency component of received pulsed signals, said apparatus comprising means for detecting said component of said received signals, a source of reference signal at said predetermined frequency, means coupled to receive the detected component and said reference signal and operative to synchronize said reference signal to said detected component, actuable means for producing second pulsed signals containing a component at said predetermined frequency, means for applying the synchronized reference signal to said actuable means, a source of carrier signal, phase shifting means connected to receive said carrier signal and said synchronized reference signal for repetitively phase shifting said carrier signal from one to the other of two phase values whereby the same carrier phase values recur at the frequency of said synchronized reference signal, and a modulator coupled to said actuable means and to said phase shifting means, said second pulsed signals amplitude modulating the repetitively phase shifted carrier signal to produce said first pulsed signals.

5. Apparatus for generating pulsed first signals having a predetermined frequency component which is synchronized to an equal frequency component of received pulsed Teletype signals, the frequency of said equal frequency component being related to the Teletype character repetition rate, said apparatus comprising means for detecting said component of said received signals, a source of reference signal at said predetermined frequency, means coupled to receive the detected component and said reference signal and operative to synchronize said reference signal to said detected component, actuable means for producing second pulsed signals containing a component at said predetermined frequency, means for applying the synchronized reference signal to said actuable means, a source of carrier signal, phase shifting means connected to receive said carrier signal and said synchronized reference signal for repetitively phase shifting said carrier signal from one to the other of two phase values whereby the same carrier phase values recur at the frequency of said synchronized reference signal, and an amplitude modulator coupled to said actuable means and to said phase shifting means, said second pulsed signals amplitude modulating the repetitively phase shifted carrier signal to produce said pulsed first signals.

6. Apparatus for generating first pulsed Teletype signals having a predetermined frequency component which is synchronized to an equal frequency component of received pulsed Teletype signals, the frequency of said predetermined component being related to the Teletype character repetition rate, said apparatus comprising means for detecting said component of said received signals, a source of reference signal at said predetermined frequency, means coupled to receive the detected component and said reference signal and operative to synchronize said reference signal to said detected component, actuable means for producing second pulsed signals containing a component at said predetermined frequency, means for applying the synchronized reference signal to said actuable means, a source of carrier signal, phase shifting means connected to receive said carrier signal and said synchronized reference signal for repetitively phase shifting said carrier signal from one to the other of two quadrature phase values whereby the same carrier phase values recur at the frequency of said synchronized reference signal and a modulator coupled to said actuable means and to said phase shifting means, said second pulsed signals amplitude modulating the repetitively phase shifted carrier signal to produce said first pulsed Teletype signals.

7. Apparatus for transmitting a first pulsed signal having a predetermined frequency component which is synchronized to an equal frequency component of received pulsed signals, said apparatus comprising phase sensitive means for detecting said component of said received signals, a source of reference signal at said predetermined frequency, means coupled to receive the detected component and said reference signal and operative to synchronize said reference signal to said detected component, actuable means for producing second pulsed signals containing a component at said predetermined frequency, means for applying the synchronized reference signal to said actuable means, a source of carrier signal, phase shifting means connected to receive said carrier signal and said synchronized reference signal for repetitively phase shifting said carrier signal from one to the other of two phase values whereby the same carrier phase values recur at the frequency of said synchronized reference signal, a modulator coupled to said actuable means and to said phase shifting means, said second pulsed signals amplitude modulating the repetitively phase shifted carrier signal to produce said first pulsed signals and transmitting means coupled to said modulating means for transmitting said first pulsed signals.

8. Apparatus for transmitting first pulsed signals having a predetermined frequency component which is synchronized to an equal frequency component of received pulsed Teletype signals, the frequency of said equal frequency component being related to the Teletype character repetition rate, said apparatus comprising means for detecting said component of said received signals, a source of reference signal at said predetermined frequency, means coupled to receive the detected component and said reference signal and operative to synchronize said reference signal to said detected component, means for producing second pulsed signals containing a component at said predetermined frequency, means for applying the synchronized reference signal to said actuable means, a source of carrier signal, phase shifting means connected to receive said carrier signal and said synchronized reference signal for repetitively phase shifting said carrier signal from one to the other of two quadrature phase values whereby the same carrer phase values recur at the frequency of said synchronized reference signal, a modulator coupled to said actuable means and to said phase shifting means, said second pulsed signals amplitude modulating the repetitively phase shifted carrier signal to produce said first pulsed signals, and means connected to said modulating means for transmitting said first pulsed signals.

9. Means for receiving first and second pulsed carrier signals, each of said pulsed signals containing a predetermined signal component of the same frequency, the carrier of each of said pulsed signals being repetitively phase shifted from one to the other of two phase values whereby the same phase values of each carrier recur at the frequency of said predetermined component, said means for receiving comprising first and second phase sensitive means for detecting respective ones of said first and second pulsed signals, a source of third signals having the same frequency as said predetermined signal component, means connected to said first phase sensitive means and to said source of said third signals for synchronizing said third signals to said predetermined signal component of said first pulsed signal, phase shifting means connected to said source of third signals for phase shifting said third signals, means connected to said second phase sensitive means and to said phase shifting means for synchronizing the phase shifted third signals to said predetermined signal component of said second pulsed signals, means for indicating the amount of phase shift introduced by said means for phase shifting, and means for separately amplitude demodulating each of said first and second pulsed signals.

10. Means for receiving first and second pulsed carrier signals, each of said pulsed signals containing a predetermined signal component of the same frequency, the carrier of each of said pulsed signals being repetitively phase shifted from one to the other of two phase values whereby the same phase values of each carrier recur at the frequency of said predetermined component, said means for receiving comprising first and second phase sensitive means for detecting respective ones of said first and second pulsed signals; each said phase sensitive means including a source of reference signal at the frequency of a respective carrier signal, and means for producing a quadrature relationship between the phase of said reference signal and one of said two phase values of said respective carrier signal; a source of third signals having the same frequency as said predetermined signal component, means connected to said first phase sensitive means and to said source of said third signals for synchronizing said third signals to said predetermined signal component of said first pulsed signal, phase shifting means connected to said source of said third signals for phase shifting said third signals, means connected to said second phase sensitive means and to said phase shifting means for synchronizing the phase shifted third signals to said predetermined signal component of said second pulsed signals, means for indicating the amount of phase shift introduced by said means for phase shifting, and means for separately amplitude demodulating each of said first and second pulsed signals.

11. Means for receiving first and second pulsed Teletype signals, each of said pulsed signals containing a predetermined component of the same frequency, the frequency of said component being related to the Teletype character repetition rate, the carrier of each of said pulsed signals being repetitively phase shifted from one to the other of two quadrature phase values whereby the same phase values of each carrier recur at the frequency of said predetermined component, said means for receiving comprising first and second phase sensitive means for detecting respective ones of said first and second pulsed Teletype signals, a source of third signals having the same frequency as said predetermined signal component, means connected to said first phase sensitive means and to said source of said third signals for synchronizing said third signals to said predetermined signal component of said first pulsed Teletype signal, phase shifting means connected to said source of said third signals for phase shifting said third signals, means connected to said second phase sensitive means and to said phase shifting means for synchronizing the phase shifted third signals to said predetermined signal component of said second pulsed Teletype signal, means for indicating the amount of phase shift introduced by said means for phase shifting, and means for separately demodulating each of said first and second pulsed Teletype signals to extract the message data conveyed thereby.

12. Means for receiving first and second pulsed Teletype signals, each of said pulsed signals containing a predetermined component of the same frequency, the frequency of said component being related to the Teletype character repetition rate, the carrier of each of said pulsed Teletype signals being repetitively phase shifted from one to the other of two quadrature phase values whereby the same phase values of each carrier recur at the frequency of said predetermined component, said means for receiving comprising first and second phase sensitive means for detecting respective ones of said first and second pulsed Teletype signals; each said phase sensitive means including a source of reference signal at the carrier frequency of a respective pulsed Teletype signal, and means for producing a quadrature relationship between the phase of said reference signal and one of said two phase values of the carrier of said respective pulsed Teletype signal; a source of third signals having the same frequency as said predetermined signal component, means connected to said first phase sensitive means and to said source of said third signals for synchronizing said third signals to said predetermined signal component of said first pulsed Teletype signal, phase shifting means connected to said source of said third signals for phase shifting said third signals, means connected to said second phase sensitive means and to said phase shifting means for synchronizing the phase shifted third signals to said predetermined signal component of said second pulsed Teletype signal, means for indicating the amount of phase shift introduced by said means for phase shifting, and means for separately demodulating each said first and second pulsed Teletype signals to extract the message data conveyed thereby.

No references cited.